(No Model.)

F. & A. WALTON.
FOLDING BICYCLE RACK.

No. 598,298. Patented Feb. 1, 1898.

Witnesses
Marcus L. Byng.
Victor J. Evans.

Inventors:
Frank Walton and
Alfred Walton.
by John Wedderburn
Attorney

United States Patent Office.

FRANK WALTON AND ALFRED WALTON, OF PATERSON, NEW JERSEY.

FOLDING BICYCLE-RACK.

SPECIFICATION forming part of Letters Patent No. 598,298, dated February 1, 1898.

Application filed July 30, 1897. Serial No. 646,515. (No model.)

*To all whom it may concern:*

Be it known that we, FRANK WALTON and ALFRED WALTON, citizens of the United States, residing at Paterson, in the county of Passaic and State of New Jersey, have invented certain new and useful Improvements in Folding Bicycle Racks or Stands; and we do hereby declare the following to be a full, clear, and exact description of the invention, such as will enable others skilled in the art to which it appertains to make and use the same.

Our invention relates to stands or racks for bicycles.

The primary object of this invention is to provide a device of this character that can be readily folded into compact form to be conveniently carried from place to place.

A further object of the invention is to provide a stand or rack of this character that will be specially simple in construction, durable, economical, and reliable in use.

With these and other objects in view, which will become apparent in the course of the following description, our invention consists in the novel combination and arrangement of simple parts that will be hereinafter fully described, and the points of novelty pointed out in the claims.

We are enabled to accomplish the objects of our invention by the simple means illustrated in the accompanying drawings, in which—

Figure 1:
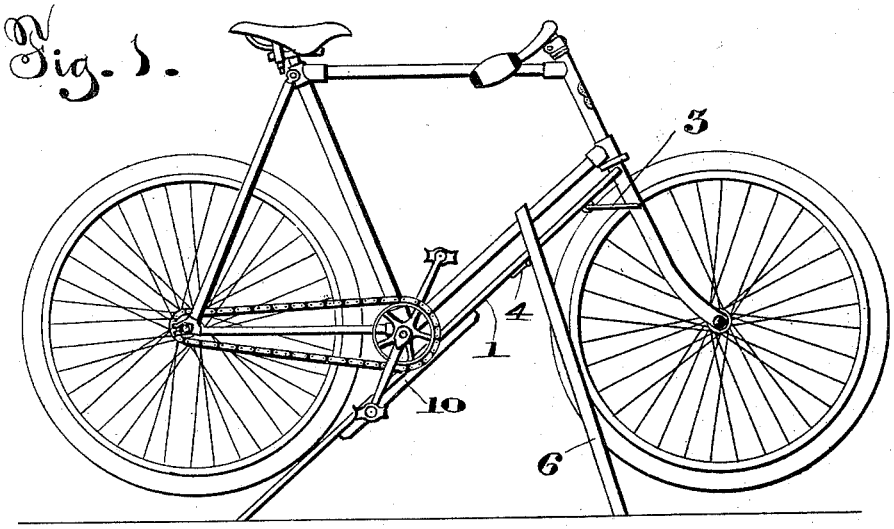
Figure 2:
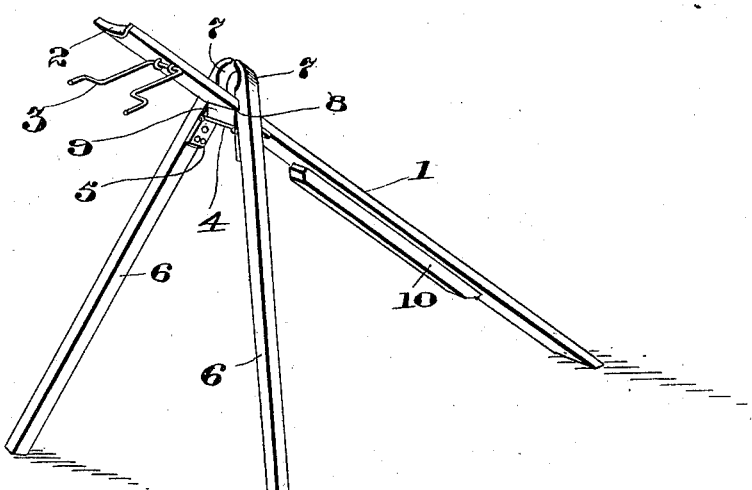
Figure 3:
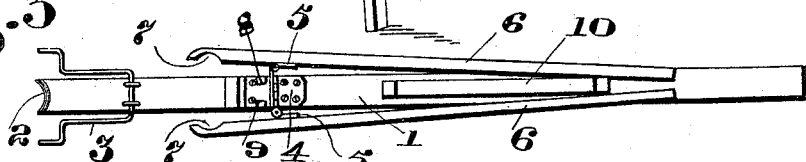
Figure 4:
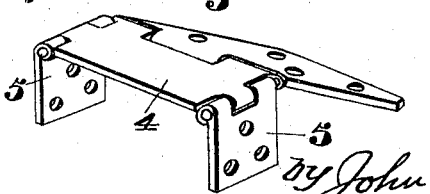

Figure 1 represents a side elevation of a bicycle with our improved device applied. Fig. 2 is a perspective view of the rack or stand. Fig. 3 is a bottom plan view thereof, the supporting-legs being in folded position. Fig. 4 is a detail perspective view of the hinge for securing the legs to the main portion of the support.

Referring to the drawings, the numeral 1 indicates a bar constructed, preferably, of hard wood, provided in its forward end with a semicircular recess 2, adapted to embrace the rear portion of the steering-head of the bicycle. Secured to the said bar near the forward end thereof is a two-armed member 3, adapted to engage the front fork of the bicycle when the device is in position to support the machine.

The numeral 4 indicates a hinge secured to the under side of the bar 1 a short distance from the forward end thereof, and said hinge in the present instance has secured in the opposite sides thereof hinges 5, which in turn are secured to the inner sides of supporting-legs 6. Said legs extend a short distance above the bar 1 and have their inner faces recessed, as indicated by the numeral 7, for the purpose of embracing the lower oblique bar of the frame of the bicycle.

The bar 1 is preferably recessed on opposite sides, as indicated by the numeral 8, and said recesses are adapted to receive the portions of the legs 6 immediately above the hinges 5, and said legs in practice will also be constructed of hard wood. To form a solid bearing-surface for the hinge 4 when the device is in extended position or in position for use, we provide a triangular block 9, either formed integral with the bar 1 or secured thereto by any convenient means. In practice felt, rubber, or other yielding material is provided in the recesses in the upper ends of the supporting-legs 6, and we also preferably provide similar material in the recess 2 at the forward end of the main supporting-bar 1 for the obvious purpose of preventing the machine from being marred or scratched.

To fold the device, it is only necessary to move the folding legs toward each other, which movement, it will be seen, will cause the upper ends of the bars to disengage the lower oblique bar of the bicycle. When the bars are moved together, the same can be folded closely against the bar 1, said legs turning upon the hinge 4. We further preferably provide on the under side of the bar 1 a wooden member 10, which may be integral with the bar 1 or in any convenient manner secured thereto for the purpose of strengthening the bar 1, and it will be seen that as said member is slightly narrower than the bar 1 the edges of said bar will form supports for the supporting-legs when folded and enable them to be folded into compact form.

From the foregoing description it will be seen that the device as described is especially simple and that the objects of the invention are effectually accomplished.

Having thus described our invention, what we claim as new, and desire to secure by Letters Patent, is—

1. A rack or stand for bicycles, the same comprising an oblique bar adapted to extend parallel or approximately parallel with the lower oblique bar of the bicycle when the same is in position for use, laterally-extensible legs hinged to the oblique bar and having their free ends extending above said bar and provided with recesses adapted to embrace the oblique bar of the bicycle, substantially as and for the purpose set forth.

2. In a bicycle rack or stand, the combination with the oblique bar having a semicircular recess in its forward end adapted to embrace the steering-head of the bicycle, and recesses in the sides thereof, of two laterally-extensible legs hinged to the under side of said bar said legs being adapted to rest in the recesses in the sides of the bar, and having their upper ends extended above the top of said bar and provided with recesses adapted to embrace the lower oblique bar of the bicycle, substantially as described.

3. The combination with the oblique bar having a semicircular recess in its forward end and recesses in its sides, of a two-armed member secured to said bar and adapted to rest against the fork of the bicycle, legs hinged to a hinge secured to the under side of the bar, suitable bearing-surfaces for said hinge, said legs extending a short distance above the oblique bar and formed with recesses on their inner faces adapted to embrace the lower oblique bar of the bicycle, substantially as and for the purpose set forth.

In testimony whereof we have signed this specification in the presence of two subscribing witnesses.

FRANK WALTON.
ALFRED WALTON.

Witnesses:
WILLIAM WALTON,
ALLAN LOVE.